United States Patent
Lin et al.

(10) Patent No.: US 11,392,218 B2
(45) Date of Patent: Jul. 19, 2022

(54) DATA FILTERING DEVICE AND DATA FILTERING METHOD

(71) Applicant: Institute For Information Industry, Taipei (TW)

(72) Inventors: Chi-Han Lin, Taipei (TW); Chi-Hsien Liu, Taipei (TW)

(73) Assignee: INSTITUTE FOR INFORMATION INDUSTRY, Taipei (TW)

( * ) Notice: Subject to any disclaimer, the term of this patent is extended or adjusted under 35 U.S.C. 154(b) by 0 days.

(21) Appl. No.: 17/067,022

(22) Filed: Oct. 9, 2020

(65) Prior Publication Data
US 2022/0066574 A1 Mar. 3, 2022

(30) Foreign Application Priority Data

Aug. 26, 2020 (TW) ................................. 109129157

(51) Int. Cl.
*G06F 3/01* (2006.01)
*G06F 3/0346* (2013.01)

(52) U.S. Cl.
CPC ................... *G06F 3/0346* (2013.01)

(58) Field of Classification Search
None
See application file for complete search history.

(56) References Cited

U.S. PATENT DOCUMENTS

| | | | |
|---|---|---|---|
| 10,089,789 B2 | 10/2018 | Tohme et al. | |
| 10,146,335 B2 | 12/2018 | Balan et al. | |
| 10,345,925 B2 | 7/2019 | Du Bois et al. | |
| 2018/0260601 A1* | 9/2018 | Brebner | G06F 3/011 |
| 2019/0384408 A1* | 12/2019 | Iyer | G02B 27/017 |

FOREIGN PATENT DOCUMENTS

| | | |
|---|---|---|
| CN | 107992189 A | 5/2018 |
| CN | 108604119 A | 9/2018 |
| CN | 109448835 A | 3/2019 |
| CN | 109766569 A | 5/2019 |
| JP | 6531228 B2 | 6/2019 |
| TW | 201842431 A | 12/2018 |

OTHER PUBLICATIONS

Office Action to the corresponding Taiwan Patent Application rendered by the Taiwan Intellectual Property Office (TIPO) dated Jul. 12, 2021, 9 pages (including English translation).

* cited by examiner

*Primary Examiner* — Carl Adams
(74) *Attorney, Agent, or Firm* — CKC & Partners Co., LLC (57) ABSTRACT

A data filtering device stores a piece of standard track data and a piece of target track data. The piece of standard track data corresponds to a standard track in a six degree-of-freedom (DoF) virtual space constructed by a plurality of virtual space units, and the piece of target track data corresponds to a target track in the six-DoF space. The data filtering device determines whether a degree of similarity between the standard track and the target track is lower than a threshold of similarity. When determining that the degree of similarity is lower than the threshold of similarity, the data filtering device classifies the piece of target track data as an invalid data.

14 Claims, 7 Drawing Sheets

DATA FILTERING DEVICE AND DATA FILTERING METHOD

PRIORITY

This application claims priority to Taiwan Patent Application No. 109129157 filed on Aug. 26, 2020, which is hereby incorporated by reference in its entirety.

FIELD

The present disclosure relates to a data filtering device and a data filtering method. More specifically, the present disclosure relates to a data filtering device and a data filtering method for filtering data through analyzing tracks in a six-degrees-of-freedom (hereinafter referred to as "six-DoF") virtual space.

BACKGROUND

In order to establish a track recognition model capable of recognizing whether a target track is similar to a standard track, it is usually necessary to collect a large amount of track data for the use of machine learning. However, the collected original track data may cover a variety of types of tracks, which are not all beneficial to the establishment of the track recognition model, and this may lead to too many wrong or unsuitable track data being referred in the process of machine learning, thereby reducing the efficiency and performance of the track recognition model. Accordingly, it is important in the art to effectively filter the collected original track data.

SUMMARY

In order to solve at least the aforesaid problems, the present disclosure provides a data filtering device. The data filtering device may comprise a storage and a processor electrically connected with the storage. The storage may store a piece of standard track data and a piece of target track data. The piece of standard track data may correspond to a standard track in a six-DoF virtual space constructed by a plurality of virtual space units. The piece of target track data may correspond to a target track in the six-DoF virtual space. The processor may determine whether a degree of similarity between the standard track and the target track is lower than a threshold of similarity. The processor may further classify the piece of target track data as a piece of invalid data when determining that the degree of similarity is lower than the threshold of similarity.

In order to solve at least the aforesaid problems, the present disclosure further provides a data filtering method. The data filtering method may be applied to a computing device. The computing device may store a piece of standard track data and a piece of target track data. The piece of standard track data may correspond to a standard track in a six-DoF virtual space constructed by a plurality of virtual space units. The piece of target track data may correspond to a target track in the six-DoF virtual space. The data filtering method may comprise:

determining, by the computing device, whether a degree of similarity between the standard track and the target track is lower than a threshold of similarity; and classifying, by the computing device, the piece of target track data as a piece of invalid data when determining that the degree of similarity is lower than the threshold of similarity.

According to the above description, the data filtering device and data filtering method provided by the present disclosure determine whether the target track data is invalid data by comparing the degree of similarity between the target track presented by each piece of target track data in a six-DoF virtual space and another standard track, thereby filtering out the target track data of which the degree of similarity is lower than a threshold of similarity. Through such a way of data filtering, reference to too many wrong or unsuitable track data can be effectively avoided in the process of machine learning, thereby improving the efficiency and performance of the track recognition model.

The summary section overall describes the core concept of the present disclosure and covers the problem to be solved, the means to solve the problem and the effect of the present disclosure, so as to provide a basic understanding of the present disclosure for a person having ordinary skill in the art. However, it shall be appreciated that, the summary section is not intended to encompass all embodiments of the present disclosure but is provided only to present the core concept of the present disclosure in a simple form and as an introduction to the following detailed description.

DETAILED DESCRIPTION

The exemplary embodiments described below are not intended to limit the present disclosure to any specific environment, applications, structures, processes or steps as described in these embodiments. In the attached figures, elements not directly related to the present disclosure are omitted from depiction. In the attached figures, dimensional relationships among individual elements in the attached drawings are merely examples but not to limit the actual scale. Unless otherwise described, the same (or similar) element symbols may correspond to the same (or similar) elements in the following description. Unless otherwise described, the quantity of each element described below may be one or more under implementable circumstances.

Figure 1:
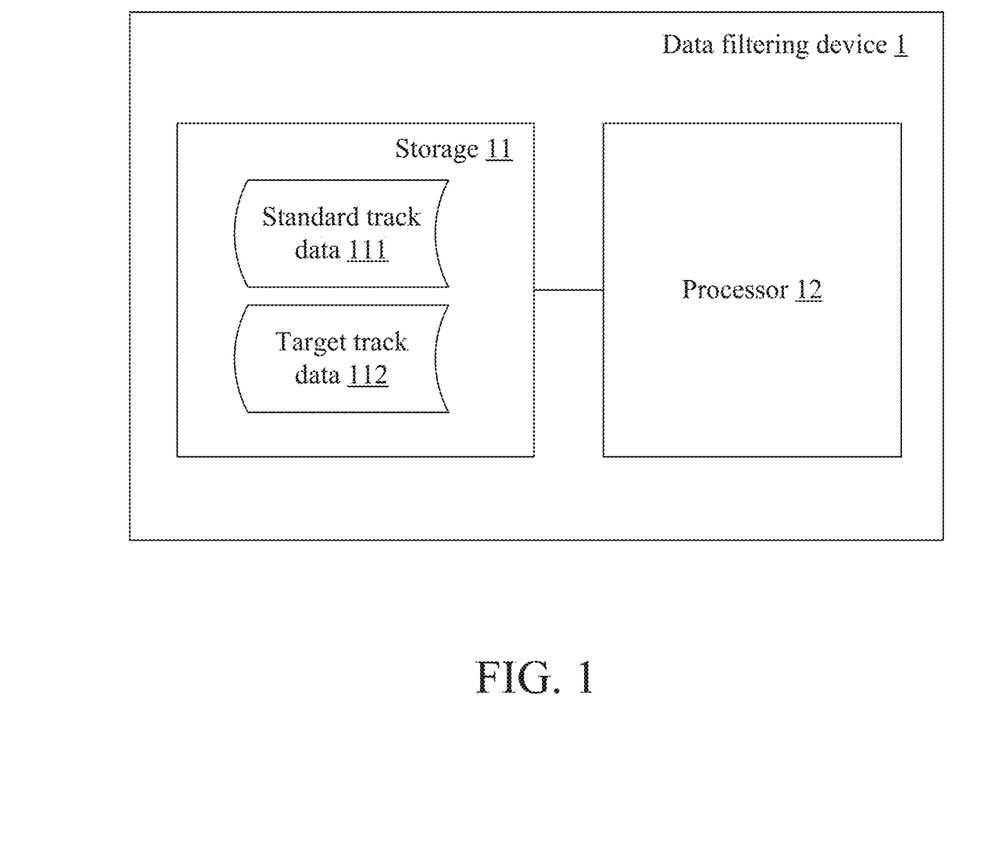
FIG. 1 illustrates a data filtering device according to one or more embodiments of the present disclosure.

FIG. 1 illustrates a data filtering device according to one or more embodiments of the present disclosure. The contents shown in FIG. 1 are only for explaining the embodiments of the present disclosure instead of limiting the claimed invention.

Referring to FIG. 1, a data filtering device 1 may basically comprise a storage 11 and a processor 12, and the storage 11 may be electrically connected with the processor 12. The electrical connection between the storage 11 and the processor 12 may be direct connection (i.e., connected not via other elements) or indirect connection (i.e., connected via other elements). The data filtering device 1 may be one of various computing devices, such as desktop computers, portable computers, mobile phones, portable electronic accessories (glasses, watches, etc.) or the like.

The processor 12 may be any of various microprocessors or microcontrollers capable of signal processing. The microprocessor or the microcontroller is a kind of programmable special integrated circuit that has the functions of operation, storage, output/input or the like. Moreover, the microprocessor or the microcontroller can accept and process various coded instructions, thereby performing various logical operations and arithmetical operations, and outputting corresponding operation results. The processor 12 may be programmed to interpret various instructions so as to process the data in the data filtering device 1 and execute various operational programs or applications.

The storage 11 may be configured to store data generated by the data filtering device 1, data transmitted from external devices or data input by a user. The storage 11 may comprise a first-level memory (which is also called a main memory or internal memory), and the processor 12 may directly read instruction sets stored in the first-level memory, and execute these instruction sets if needed. The storage 11 may optionally comprise a second-level memory (which is also called an external memory or secondary memory), and the second-level memory may use a data buffer to transmit data stored to the first-level memory. For example, the second-level memory may be a hard disk, an optical disk or the like, without being limited thereto. The storage 11 may optionally comprise a third-level memory, i.e., a storage device that can be inserted into or pulled out from a computer directly, e.g., a mobile disk. The storage 11 may be configured to store a piece of standard track data 111 and one or more pieces of different target track data 112.

The standard track data 111 and the target track data 112 may be information generated when a target object translates and/or rotates in a virtual space (i.e., "six-DoF data"). For example, the standard track data 111 may comprise six-DoF data representing a standard track in a six-DoF virtual space, while the target track data 112 may comprise six-DoF data representing a target track in the six-DoF virtual space. Six-DoF means that the target object can translate in any of the directions of three mutually perpendicular coordinate axes, i.e., forward and backward, up and down, left and right, in the six-DoF virtual space, and can also rotate relative to the directions of these three vertical axes, and the ways of rotation relative to the three directions are called pitch, yaw and roll.

Each six-DoF data may be divided into three-DoF translation data and three-DoF rotation data. In some embodiments, the standard track data 111 and the target track data 112 may each be generated by a certain six-DoF spatial sensing device which can directly sense the translation and rotation of a target object. In some other embodiments, the standard track data 111 and the target track data 112 may each be generated by a combination of three-DoF translation data generated by a certain three-DoF spatial sensing device which can sense the translation of a target object and three-DoF rotation data generated by another three-DoF spatial sensing device which can sense the rotation of the target object. In some other embodiments, the standard track data 111 and the target track data 112 may each be generated by performing various known algorithms or mathematical approaches on the three-DoF translation data which a certain three-DoF spatial sensing device generate by sensing the translation of a target object.

In some embodiments, the three-DoF translation data of a target object can be generated by an inertial measurement unit (IMU). For example, after a user moves a target object equipped with the inertial measurement unit, the three-axis gyroscope and three-direction accelerometer installed in the inertial measurement unit will measure the angular velocity and acceleration of the target object in the three-dimensional space, and then calculate the posture of the target object, thereby generating the three-DoF translation information of the target object. In some embodiments, the inertial measurement unit may be installed on the data filtering device 1, so that the data filtering device 1 can generate the three-DoF translation data thereof on its own, and in this case, the data filtering device 1 is the target object.

Figure 2A:
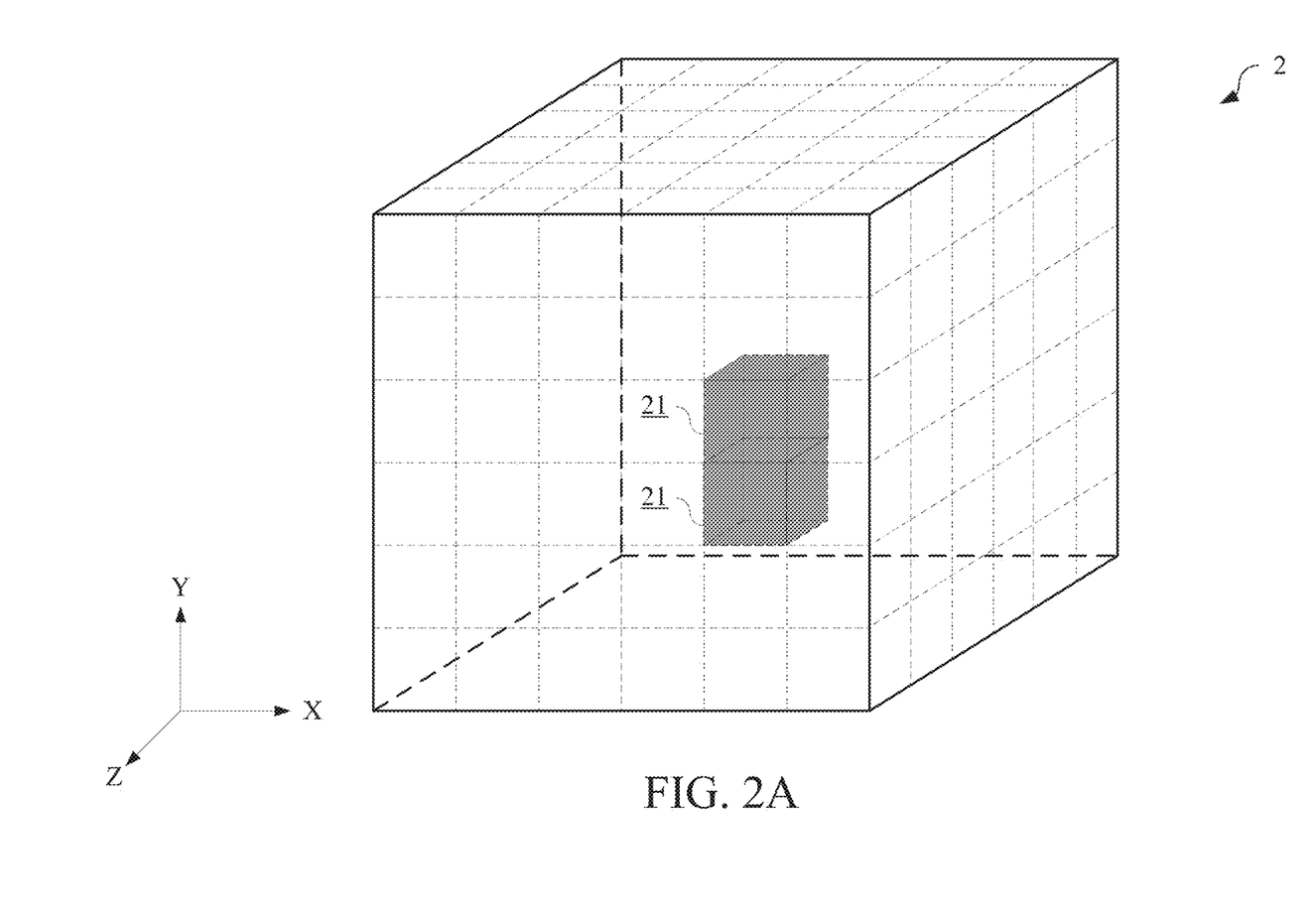
FIG. 2A illustrates a six-DoF virtual space according to one or more embodiments of the present disclosure.

FIG. 2A illustrates a six-DoF virtual space according to one or more embodiments of the present disclosure. The contents shown in FIG. 2 are only for explaining the embodiments of the present disclosure instead of limiting the claimed invention.

Referring to FIG. 1 and FIG. 2A together, the track in a six-DoF virtual space 2 may correspond to a piece of six-DoF data (i.e., including translation and rotation in three directions, i.e., up and down, left and right, front and back directions). The standard track data 111 and the target track data 112 respectively correspond to a standard track and a target track in the six-DoF virtual space 2. The standard track may be used as a standard of tracks, and whether the target track meets the standard is determined by comparing the similarity between the standard track and the target track. For example, a standard track (corresponding to the standard track data 111) may be generated by an expert and a target track (corresponding to the target track data 112) may be generated by an ordinary person, then the similarity between the target track and the standard track is determined, and whether to filter out the target track data 112 is determined according to the determination result.

The six-DoF virtual space 2 may basically be a virtual space constructed based on the virtual reality technology. The six-DoF virtual space 2 may be composed of a plurality of virtual space units 21, that is, the volume information (e.g., length, width, height, etc.) of the virtual space units 21 may be taken as the unit length (e.g., each being one meter) of the coordinate axis X, coordinate axis Y and/or coordinate axis Z in the six-DoF virtual space 2. It shall be noted that, although the virtual space unit 21 is depicted as a cube in the drawing in this application, it is not limited thereto. That is, in some embodiments, the virtual space unit 21 may be a three-dimensional virtual space unit in the form of such as a sphere, a cylinder, a polygon or other types. In addition, the size of the virtual space units 21 in the drawings of the present application are only examples, and the number of virtual space units 21 in FIG. 2A is also only an example. The size and number of the virtual space units 21 may be configured differently according to the needs of users. For example, if the user has higher requirements for the accuracy of data filtering, the size of the virtual space units 21 may be correspondingly reduced (for example, to be less than one cubic meter), and then the density of the virtual space units 21 in the six-DoF virtual space 2 will be correspondingly increased. On the other hand, if the user has lower requirements for the accuracy of data filtering, the size of the virtual space units 21 may be correspondingly increased (for example, to be larger than one cubic meter), and the density of the virtual space units 21 in the six-DoF virtual space 2 will be correspondingly decreased.

In the case where a target object comprises an inertial measurement unit, the origin of the six-DoF virtual space 2 may be set as the position where the inertial measurement unit is started. When different users move the target object, the inertial measurement unit will generate corresponding three-DoF translation data. Then, the processor 12 may perform the above-mentioned DoF transformation on the three-DoF translation data to generate standard track data 111 and target track data 112. In some embodiments, the standard track data 111 may be expressed as a plurality of virtual space units 21 occupied by a standard track in the six-DoF virtual space 2, while the target track data 112 may be expressed as a plurality of virtual space units 21 occupied by a target track in the six-DoF virtual space 2.

Figure 2B:
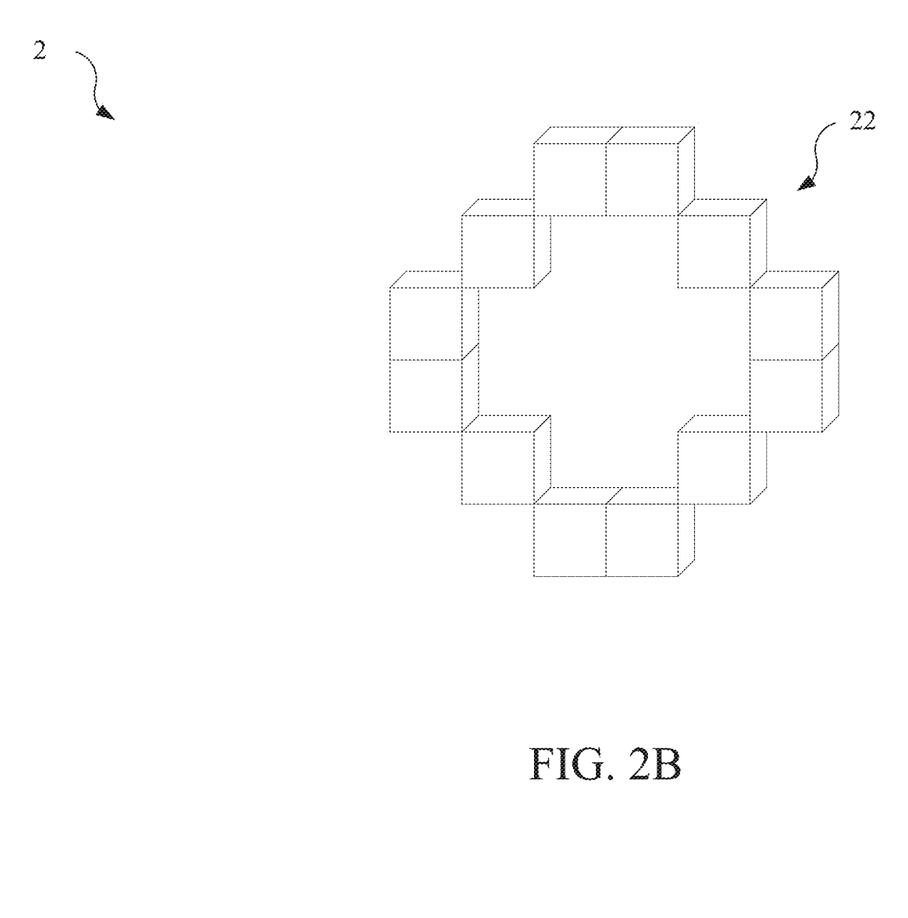
FIG. 2B illustrates a standard track according to one or more embodiments of the present disclosure.
Figure 2C:
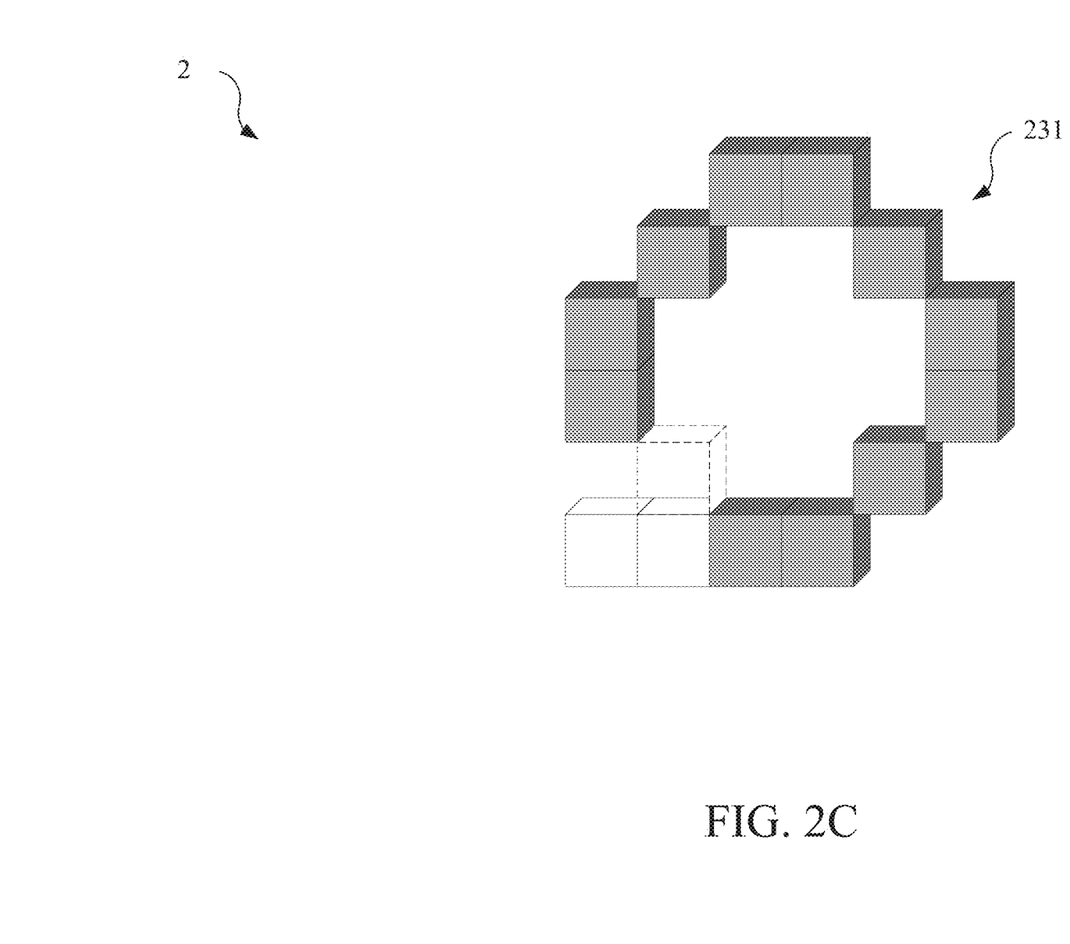
FIG. 2C to FIG. 2E illustrate different target tracks according to one or more embodiments of the present disclosure.
Figure 2D:
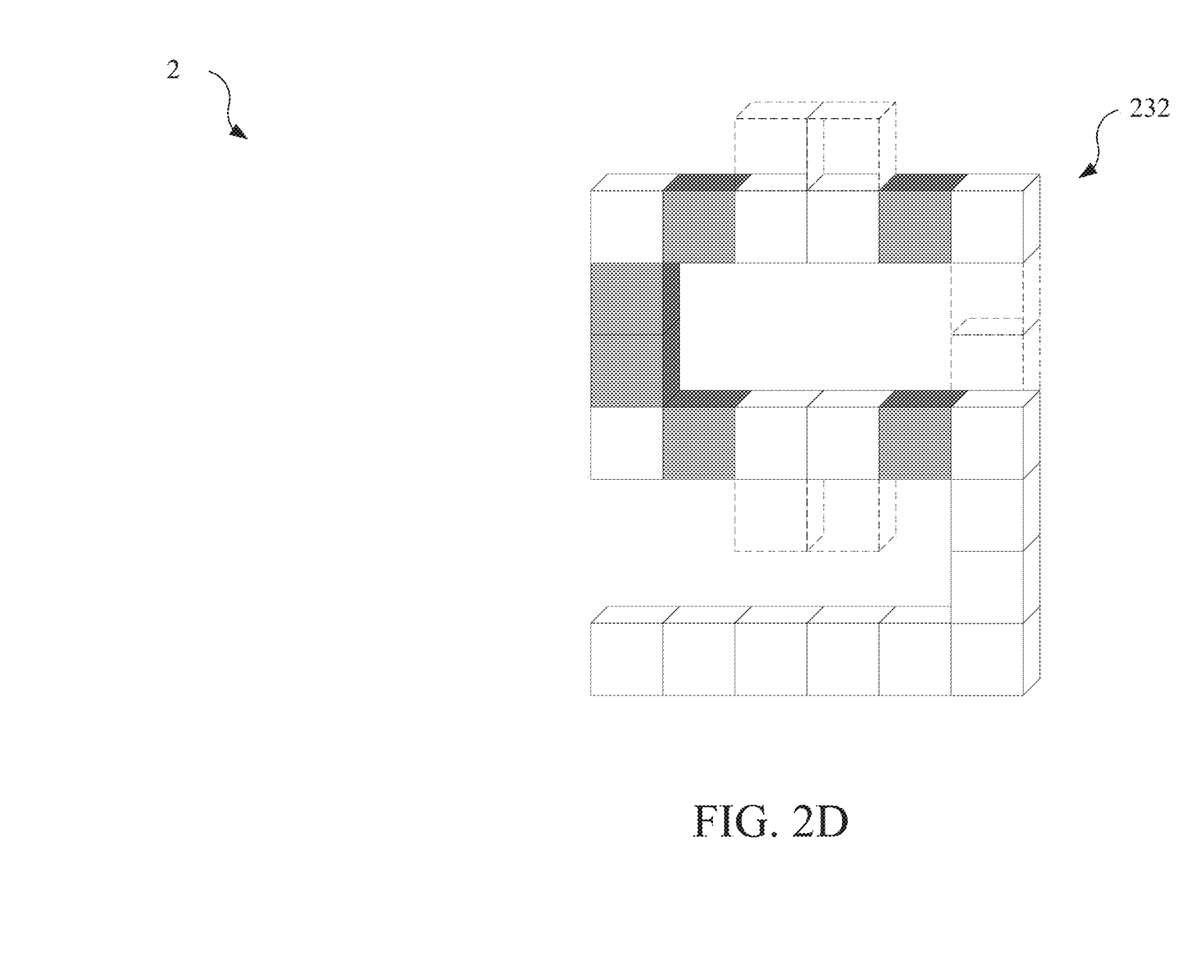
Figure 2E:
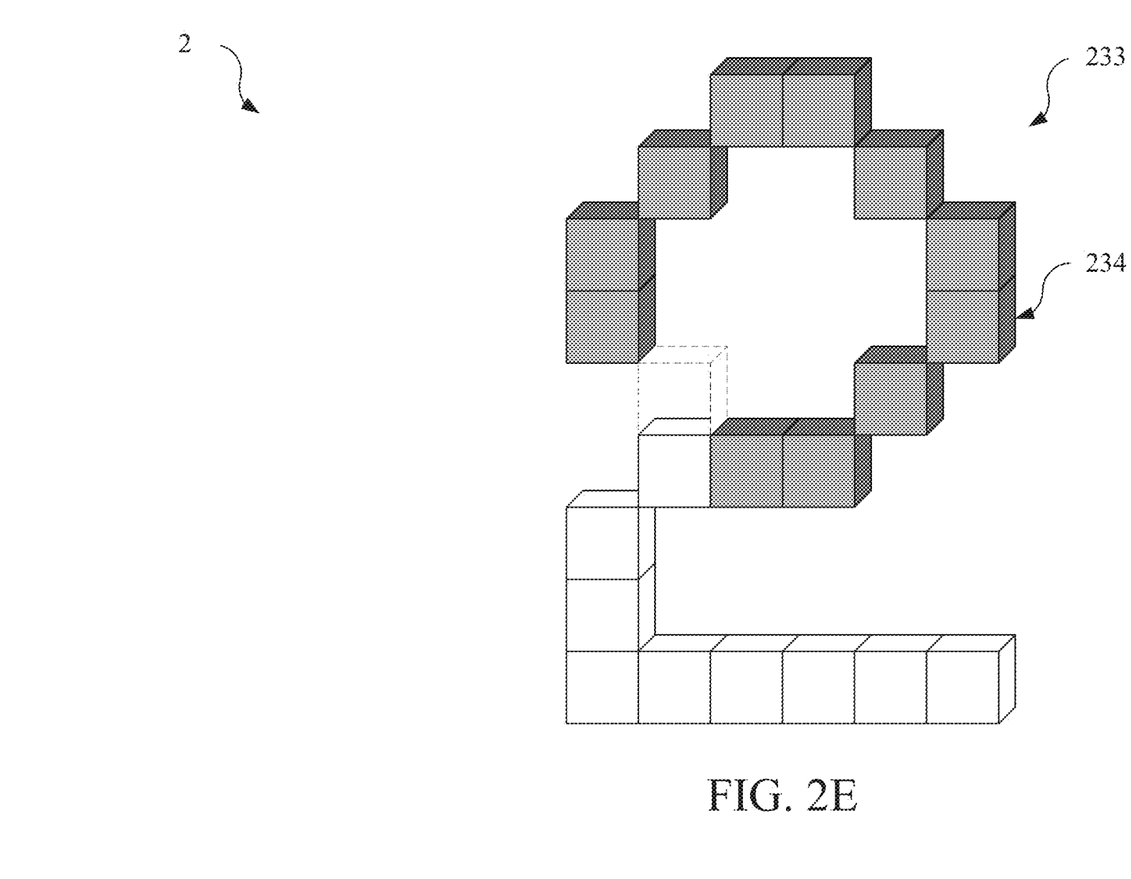

FIG. 2B illustrates a standard track according to one or more embodiments of the present disclosure. FIG. 2C to FIG. 2E illustrate different target tracks according to one or more embodiments of the present disclosure. The contents shown in FIG. 2B to FIG. 2E are only for explaining the embodiments of the present disclosure instead of limiting the claimed invention.

Referring to FIG. 1 and FIG. 2A to FIG. 2E together, in some embodiments, the standard track data 111 may correspond to the standard track 22 in the six-DoF virtual space 2, and the standard track 22 covers twelve virtual space units 21 that present a circle-like shape among the virtual space units 21. In addition, as shown in FIG. 2C to FIG. 2E, the target tracks corresponding to the target track data 112 may respectively correspond to different target tracks 231, 232, and 233 in the six-DoF virtual space 2. The processor 12 may compare the standard track 22 with each of different target tracks 231, 232 and 233 to determine whether a degree of similarity between the standard track 22 and each of the target tracks 231, 232 and 233 is lower than a threshold of similarity. In some embodiments, in addition to the threshold of similarity, the processor 12 may also determine whether a degree of difference between the standard track 22 and each of the target tracks 231, 232 and 233 is lower than a threshold of difference. The degree of similarity between the standard track 22 and each of the target tracks 231, 232, and 233 may be regarded as a number of virtual space units 21 (shown in dark gray in FIG. 2C to FIG. 2E) occupied by both the two tracks being compared, while the degree of difference between the standard track 22 and each of the target tracks 231, 232 and 233 may be regarded as a number of virtual space units 21 occupied by either of the two tracks being compared. It shall be noted that, in FIG. 2C to FIG. 2E, the virtual space units 21 corresponding to the standard track 22 but not corresponding to the target track 231, 232 or 233 are shown in the form of dashed lines.

Since the standard track data 111 and the target track data 112 may be generated in different spaces, in order to eliminate the difference between spaces, the processor 12 may first calculate the central point of the standard track 22 and the central point of each of the target tracks 231, 232 and 233, and calibrate the two central points in the six-DoF virtual space 2 before determining the degree of similarity and/or the degree of difference between the standard track 22 and each of the target tracks 231, 232 and 233. In addition, before determining the degree of similarity and/or the degree of difference between the standard track 22 and each of the target tracks 231, 232 and 233, besides the central-point calibration, the processor 12 may also first calculate a normal vector of the standard track 22 and a normal vector of each of the target tracks 231, 232 and 233, and calibrate the two normal vectors in the six-DoF virtual space 2. In some embodiments, when determining the degree of similarity and the degree of difference, the processor 12 may also perform various common calibration processing such as translation, rotation, equal scaling or the like on the standard track 22 and each of the target tracks 231, 232 and 233, so as to find out the situation with the highest degree of similarity between the two tracks as much as possible, thereby avoiding misjudgment. In some embodiments, when different degrees of similarity between the two tracks are obtained in the above-mentioned various processing, the aspect with the highest degree of similarity is selected as the basis for the determination of invalid data or valid data in the subsequent operation.

In some embodiments, when the processor 12 rotates for the standard track 22 and each of the target tracks 231, 232, 233, if the difference between the rotation angles of the standard track 22 and each of the target track 231, 232, 233 exceeds a threshold of angle difference (e.g., plus or minus forty-five degrees), but the degree of similarity between the standard track 22 and each of the target track 231, 232 and 233 still does not meet the requirement, then the processor 12 may correspondingly eliminate the target track. In some embodiments, if the user has higher requirements for the accuracy of data filtering, the threshold of angle difference may be reduced correspondingly (for example, plus or minus thirty degrees), which indicates that the acceptable rotation angle difference is relatively small. On the other hand, if the user has lower requirements for the accuracy of data filtering, then the threshold of angle difference may be increased correspondingly (for example, plus or minus ninety degrees), which indicates that the acceptable rotation angle difference is relatively large.

For convenience of description, in the following contents, the threshold of similarity and the threshold of difference between the standard track 22 and each of the target track 231, 232 and 233 are assumed to be eight and four respectively, unless stated otherwise. However, as shall be appreciated by those of ordinary skill in the art, the threshold of similarity and the threshold of difference may be changed to other values depending on the user's requirements for the accuracy of data filtering. For example, if the user has higher requirements for the accuracy of data filtering, then the threshold of similarity may be correspondingly increased (e.g., increased to twelve), and/or the threshold of difference may be correspondingly reduced (e.g., reduced to two) to filter track data more rigorously. On the other hand, if the user has lower requirements for the accuracy of data filtering, then the threshold of similarity may be correspondingly decreased (e.g., decreased to six), and/or the threshold of difference may be correspondingly increased (e.g., increased to six) to filter track data more loosely.

In some embodiments, as shown in FIG. 2C, the target track data 112 may correspond to the target track 231, and the target track 231 covers thirteen virtual space units 21 that present an inverse "C" shape among the virtual space units 21. By comparing the overlapping degree between the standard track 22 and the target track 231, the processor 12 may determine that the degree of similarity between the standard track 22 and the target track 231 is eleven, and that the degree of difference between the standard track 22 and the target track 231 is two.

Next, the processor 12 determines that the degree of similarity between the standard track 22 and the target track 231 is not lower than (i.e., higher than or equal to) the threshold of similarity, and accordingly classifies the target track data 112 corresponding to the target track 231 as valid data that can be used for training a track recognition model. In other words, the target track data 112 will not be eliminated by the data filtering device 1. In some embodiments, in addition to determining whether the degree of similarity is not lower than the threshold of similarity, the processor 12 may further determine whether the degree of difference is lower than the threshold of difference, and decide whether to classify the target track data 112 as valid data according to the two determination results.

In some embodiments, as shown in FIG. 2D, the target track data 112 may correspond to the target track 232, and the target track 232 covers nineteen virtual space units 21 that present an "S" shape among the virtual space units 21. By comparing the overlapping degree between the standard track 22 and the target track 232, the processor 12 may determine that the degree of similarity between the standard track 22 and the target track 232 is six, and that the degree of difference between the standard track 22 and the target track 232 is sixteen.

Then, the processor 12 will determine that the degree of similarity between the standard track 22 and the target track 232 is lower than the threshold of similarity, and accordingly classify the target track data 112 corresponding to the target track 232 as invalid data. In other words, the target track data 112 will be eliminated by the data filtering device 1.

In some embodiments, as shown in FIG. 2E, the target track data 112 may correspond to the target track 233, and the target track 232 covers twenty virtual space units 21 that present a 2-shape among the virtual space units 21. By comparing the overlapping degree between the standard track 22 and the target track 233, the processor 12 may determine that the degree of similarity between the standard track 22 and the target track 233 is eleven, and that the degree of difference between the standard track 22 and the target track 233 is nine.

Next, the processor 12 will determine that the degree of similarity between the standard track 22 and the target track 233 is not lower than the threshold of similarity. However, although the degree of similarity between these tracks reaches the level regulated by the threshold of similarity, the degree of difference therebetween has exceeded the tolerance range of the threshold of difference. Therefore, the processor 12 may regard a partial track 234 (i.e., the set of dark gray blocks in FIG. 2E) in the target track 233 that conforms to the standard track 22 as valid track that may still be used for training the track recognition model, and classify a part of the target track data 112 corresponding to the partial track 234 as valid data. That is, the part of the target track data 112 will be retained by the data filtering device 1, while the remaining parts will be eliminated by the data filtering device 1.

After the distinction between valid data and invalid data is completed, the part of the target track data 112 that has been classified as valid data may be used for training the track recognition model. Specifically, if the whole target track data 112 is classified as valid data, it may be used to enhance the recognition ability of the track recognition model for the whole track. If a part of the target track data 112 is classified as valid data, the part may be used to enhance the recognition ability of the track recognition model for a partial track (e.g., the partial track 234 described above) that conforms to the standard track (e.g., increasing the weight of relevant parameters in the track recognition model). Further speaking, the track recognition model may be applied to the technical field of motion recognition, and in this case, the data filtering method of this disclosure may be used to filter related motion data.

Figure 3:
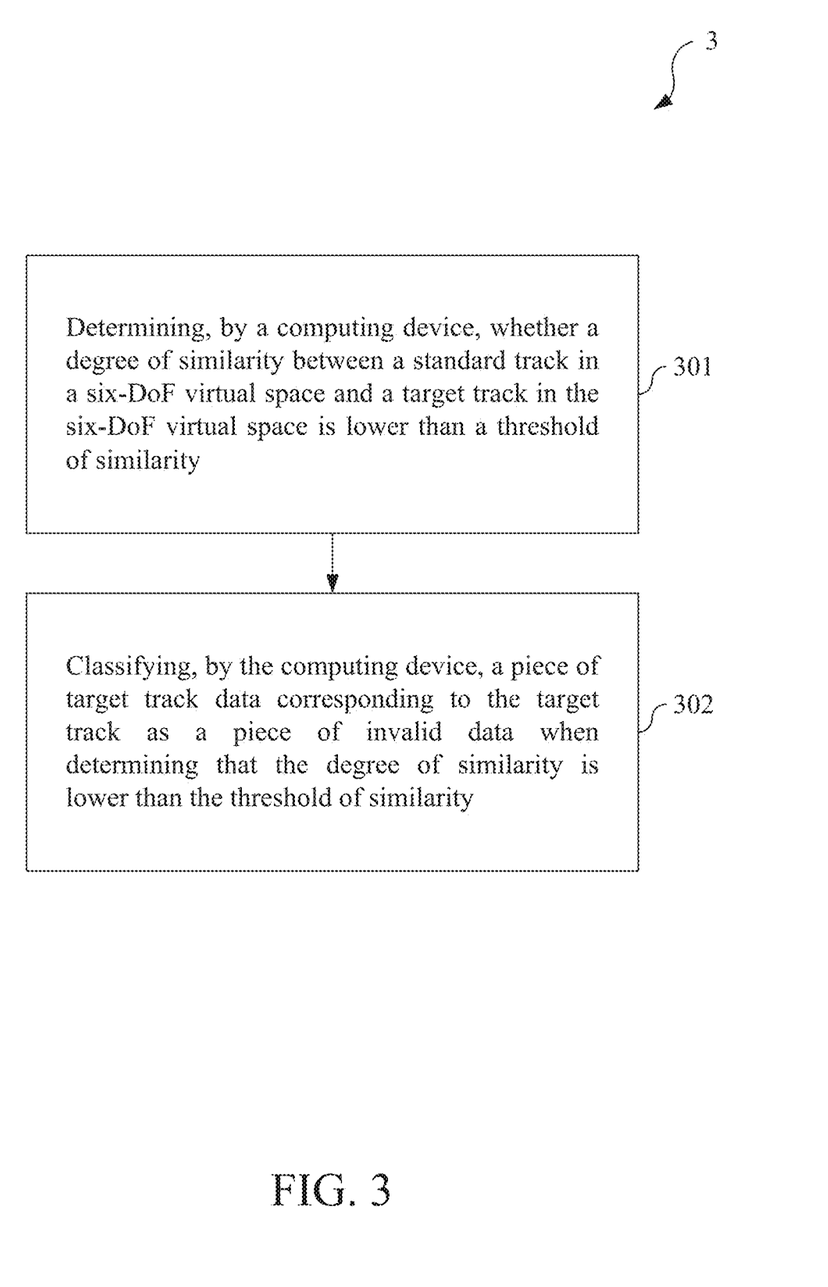
FIG. 3 illustrates a data filtering method according to one or more embodiments of the present disclosure.

FIG. 3 illustrates a data filtering method according to one or more embodiments of the present disclosure. The contents shown in FIG. 3 are only for explaining the embodiments of the present disclosure instead of limiting the claimed invention.

FIG. 3 shows a data filtering method 3 which may be applied to a computing device, and the computing device may store a piece of standard track data and a piece of target track data. The piece of standard track data may correspond to a standard track in a six-DoF virtual space constructed by a plurality of virtual space units. The piece of target track data may correspond to a target track in the six-DoF virtual space. The data filtering method 3 may comprise the following steps: determining, by the computing device, whether a degree of similarity between the standard track and the target track is lower than a threshold of similarity (labeled as 301); and classifying, by the computing device, the piece of target track data as a piece of invalid data when determining that the degree of similarity is lower than the threshold of similarity (labeled as 302).

In some embodiments, the data filtering method 3 may further comprise the following step: classifying, by the computing device, the piece of target track data as a piece of valid data when determining that the degree of similarity is not lower than the threshold of similarity.

In some embodiments, the data filtering method 3 may further comprise the following step: classifying, by the computing device, a part of the piece of target track data as a piece of valid data when determining that the degree of similarity is not lower than the threshold of similarity, wherein the part of the piece of target track data corresponds to a part of the target track, which overlaps with the standard track.

In some embodiments, the data filtering method 3 may further comprise the following step: determining, by the computing device, whether a degree of difference between the standard track and the target track is lower than a threshold of difference. The computing device may classify the piece of target track data as a piece of valid data when determining that the degree of similarity is not lower than the threshold of similarity and the degree of difference is lower than the threshold of difference.

In some embodiments, regarding the data filtering method 3, the degree of similarity may be a number of virtual space unit(s) that is occupied by both of the standard track and the target track in the six-DoF virtual space.

In some embodiments, for the data filtering method 3, an origin of the six-DoF virtual space may correspond to a position of an inertial measurement unit.

In some embodiments, the data filtering method 3 may further comprise the following step: performing, by the computing device, a transformation of DoF to a piece of three-DoF data generated by an inertial measurement unit, so as to generate each of the piece of standard track data and the piece of target track data.

In some embodiments, the data filtering method 3 may further comprise the following step: performing, by the computing device, a calibration of center points and a calibration of normal vectors to the standard track and the target track before determining whether the degree of similarity is lower than the threshold of similarity.

Each embodiment of the data filtering method 3 basically corresponds to a certain embodiment of the data filtering device 1. Therefore, people having ordinary skill in the art shall fully understand and can implement all corresponding embodiments of the data filtering method 3 simply by referring to the above description for the data filtering device 1, even if not all of the embodiments of the data filtering method 3 are described in detail above.

The above disclosure is related to the detailed technical contents and inventive features thereof. People having ordinary skill in the art may proceed with a variety of modifications and replacements based on the disclosures and suggestions of the disclosure as described without departing from the characteristics thereof. Nevertheless, although such modifications and replacements are not fully disclosed in the above descriptions, they have substantially been covered in the following claims as appended.

What is claimed is:

1. A data filtering device, comprising:
a storage, configured to store a piece of standard track data and a piece of target track data, the piece of standard track data corresponding to a standard track in a six-degrees-of-freedom (DoF) virtual space constructed by a plurality of virtual space units, the piece of target track data corresponding to a target track in the six-DoF virtual space; and
a processor electrically connected to the storage, being configured to:
determine whether a degree of similarity between the standard track and the target track is lower than a threshold of similarity; and
classify the piece of target track data as a piece of invalid data which will not be used in a process of machine learning of a track recognition model when determining that the degree of similarity is lower than the threshold of similarity;
wherein the processor is further configured to classify a part of the piece of target track data as a piece of valid data when determining that the degree of similarity is not lower than the threshold of similarity, and the part of the piece of target track data corresponds to a part of the target track, which overlaps with the standard track.

2. The data filtering device of claim 1, wherein the processor is further configured to classify the piece of target track data as a piece of valid data when determining that the degree of similarity is not lower than the threshold of similarity.

3. The data filtering device of claim 1, wherein the processor is further configured to determine whether a degree of difference between the standard track and the target track is lower than a threshold of difference, and classify the piece of target track data as a piece of valid data when determining that the degree of similarity is not lower than the threshold of similarity and the degree of difference is lower than the threshold of difference.

4. The data filtering device of claim 1, wherein the degree of similarity is a number of virtual space unit(s) that is occupied by both of the standard track and the target track.

5. The data filtering device of claim 1, wherein an origin of the six-DoF virtual space corresponds to a position of an inertial measurement unit.

6. The data filtering device of claim 1, wherein the processor is further configured to perform a transformation of DoF to a piece of three-DoF data generated by an inertial measurement unit, so as to generate each of the piece of standard track data and the piece of target track data.

7. The data filtering device of claim 1, wherein the processor is further configured to perform a calibration of center points and a calibration of normal vectors to the standard track and the target track before determining whether the degree of similarity is lower than the threshold of similarity.

8. A data filtering method, being applied to a computing device, the computing device storing a piece of standard track data and a piece of target track data, the piece of standard track data corresponding to a standard track in a six-degrees-of-freedom (DoF) virtual space constructed by a plurality of virtual space units, the piece of target track data corresponding to a target track in the six-DoF virtual space, the data filtering method comprising:
determining, by the computing device, whether a degree of similarity between the standard track and the target track is lower than a threshold of similarity;
classifying, by the computing device, the piece of target track data as a piece of invalid data which will not be used in a process of machine learning of a track recognition model when determining that the degree of similarity is lower than the threshold of similarity; and
classifying, by the computing device, a part of the piece of target track data as a piece of valid data when determining that the degree of similarity is not lower than the threshold of similarity, wherein the part of the piece of target track data corresponds to a part of the target track, which overlaps with the standard track.

9. The data filtering method of claim 8, further comprising:
classifying, by the computing device, the piece of target track data as a piece of valid data when determining that the degree of similarity is not lower than the threshold of similarity.

10. The data filtering method of claim 8, further comprising:
determining, by the computing device, whether a degree of difference between the standard track and the target track is lower than a threshold of difference; and
classifying, by the computing device, the piece of target track data as a piece of valid data when determining that the degree of similarity is not lower than the threshold of similarity and the degree of difference is lower than the threshold of difference.

11. The data filtering method of claim 8, wherein the degree of similarity is a number of virtual space unit(s) that is occupied by both of the standard track and the target track.

12. The data filtering method of claim 8, wherein an origin of the six-DoF virtual space corresponds to a position of an inertial measurement unit.

13. The data filtering method of claim 8, further comprising:
performing, by the computing device, a transformation of DoF to a piece of three-DoF data generated by an inertial measurement unit, so as to generate each of the piece of standard track data and the piece of target track data.

14. The data filtering method of claim 8, further comprising:
performing, by the computing device, a calibration of center points and a calibration of normal vectors to the standard track and the target track before determining whether the degree of similarity is lower than the threshold of similarity.

* * * * *